(12) United States Patent
Cheng

(10) Patent No.: US 7,617,948 B2
(45) Date of Patent: Nov. 17, 2009

(54) COOKWARE WITH MULTIPLE COMPONENT LID

(75) Inventor: Stanley Kin Sui Cheng, Vallejo, CA (US)

(73) Assignee: Meyer Intellectual Properties Limited (VG)

( * ) Notice: Subject to any disclaimer, the term of this patent is extended or adjusted under 35 U.S.C. 154(b) by 456 days.

(21) Appl. No.: 11/550,244

(22) Filed: Oct. 17, 2006

(65) Prior Publication Data

US 2008/0087673 A1    Apr. 17, 2008

(51) Int. Cl.
*A47J 27/00* (2006.01)
*A47J 36/00* (2006.01)
*A47J 37/01* (2006.01)

(52) U.S. Cl. .................................................. 220/573.1

(58) Field of Classification Search ................ 220/4.03, 220/254.1, 256.1, 573.1, 574
See application file for complete search history.

(56) References Cited

U.S. PATENT DOCUMENTS

| 1,968,950 | A | * | 8/1934 | Maigret ........................ 99/347 |
| 7,090,090 | B2 | | 8/2006 | Ohyama |
| 2004/0200360 | A1 | * | 10/2004 | Howell et al. .................. 99/446 |
| 2004/0216620 | A1 | * | 11/2004 | Quiggins et al. .............. 99/413 |

* cited by examiner

*Primary Examiner*—Harry A Grosso
(74) *Attorney, Agent, or Firm*—Edward S. Sherman

(57) ABSTRACT

The lid for an article of cookware is comprised of two separable components, the first being an outer annulus that rests on the rim of the cookware article, the second being a solid lid with a handle that rests on the inner circumference of the annulus. Preferably, the outer annulus is curved upwards to act as a splash and spatter guard when the solid lid removed for stirring the contents of the cooking vessel.

24 Claims, 4 Drawing Sheets

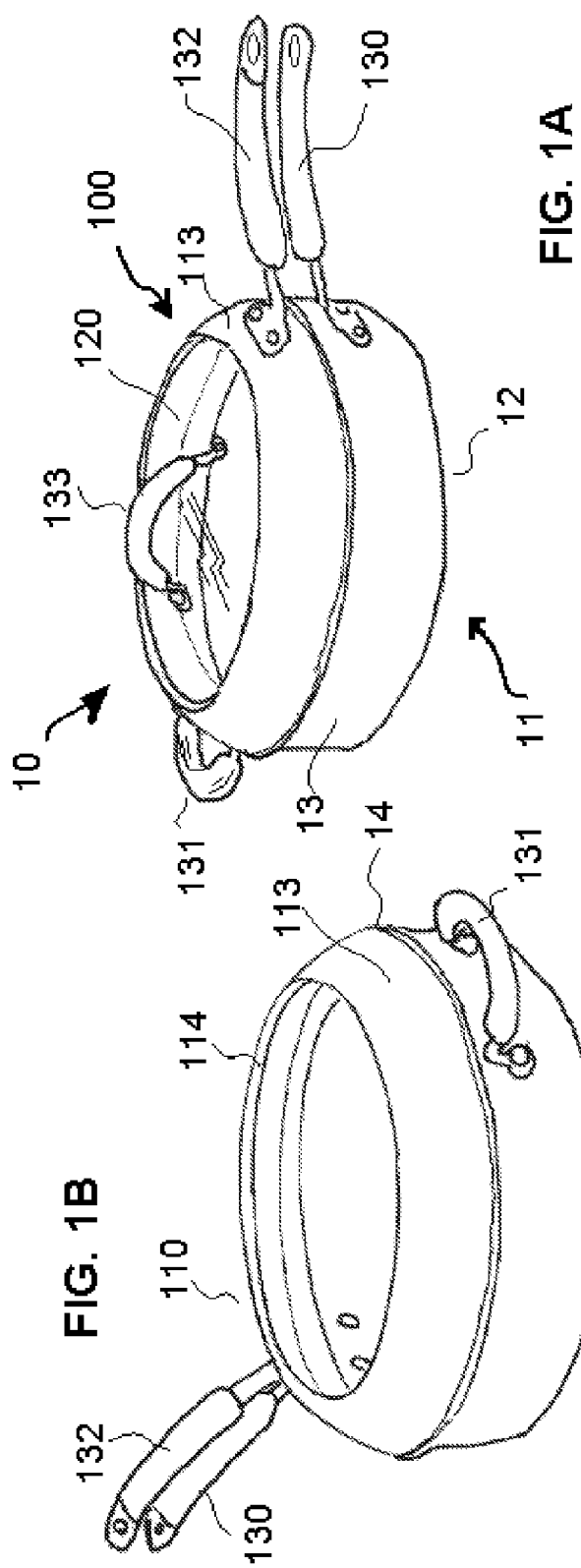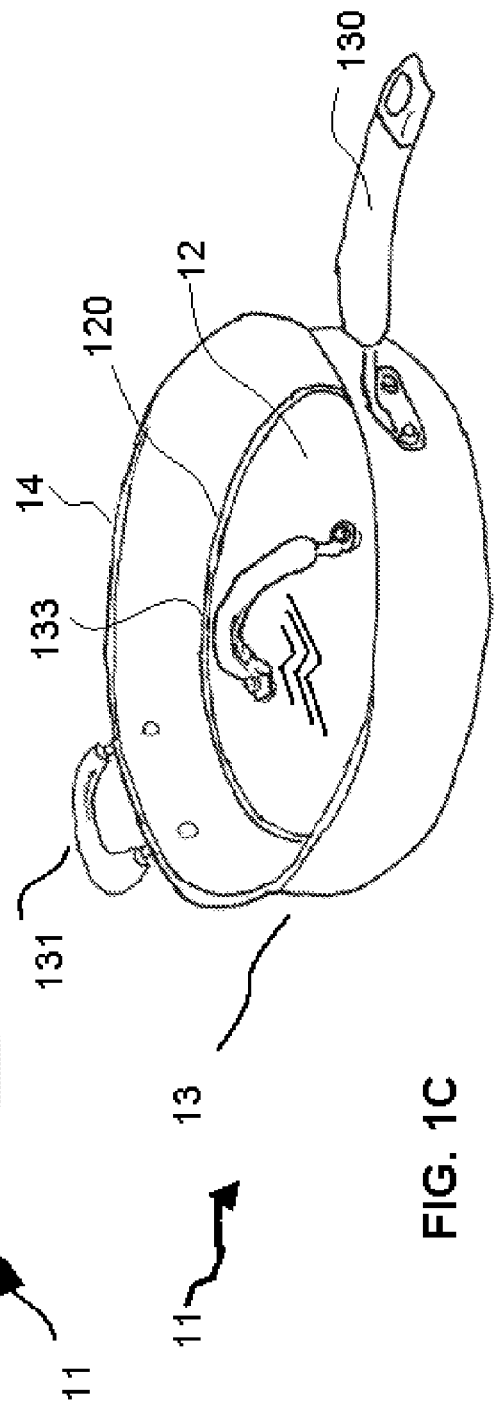

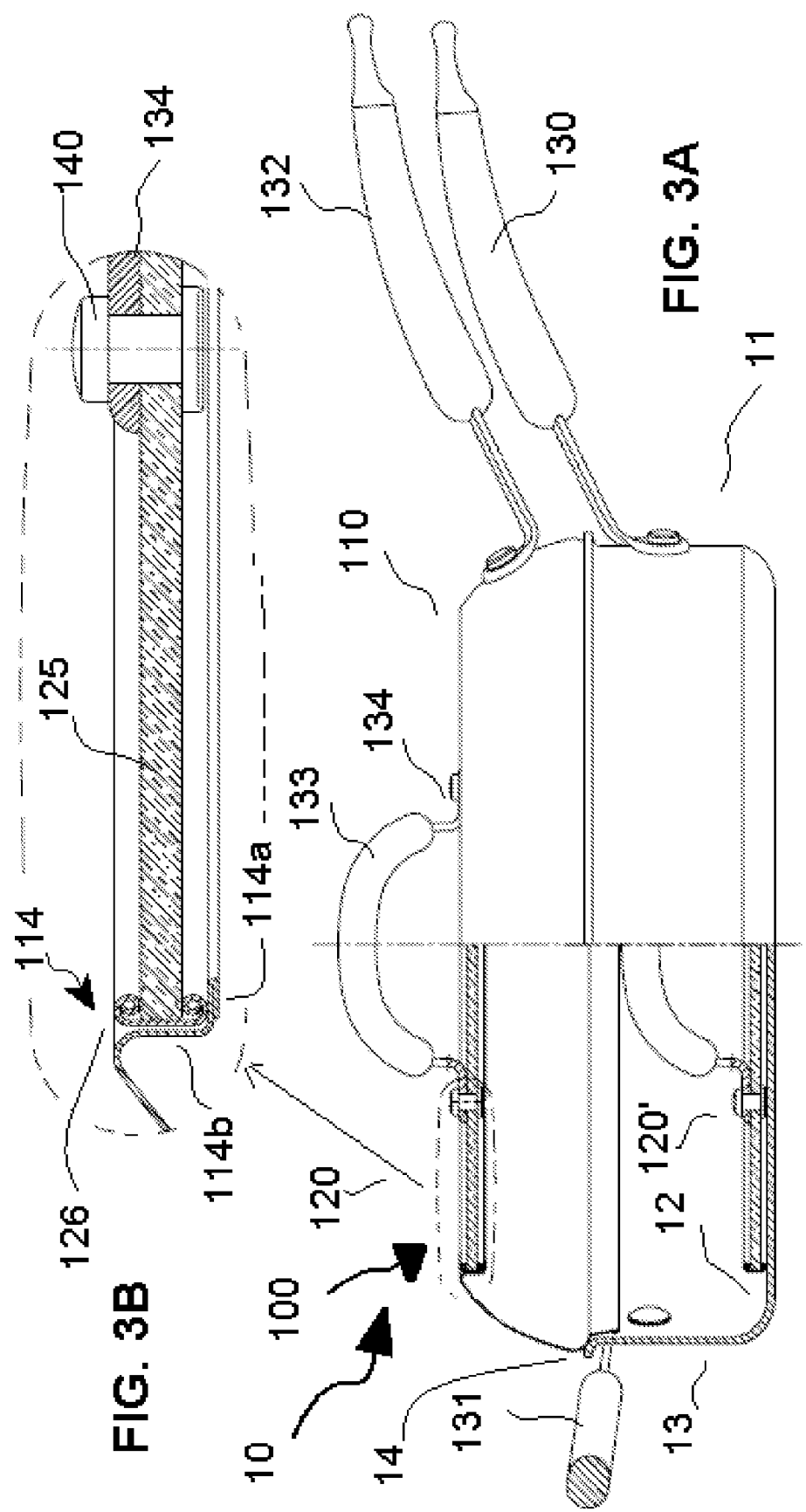

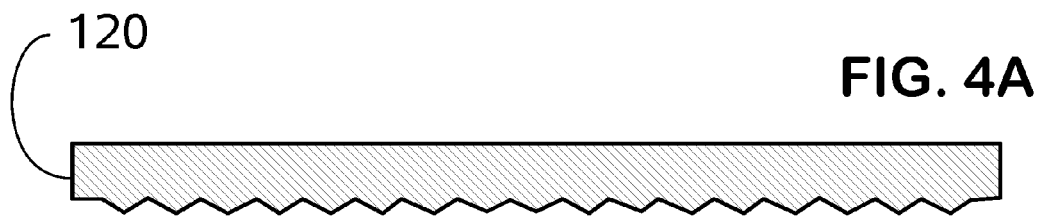
FIG. 4A
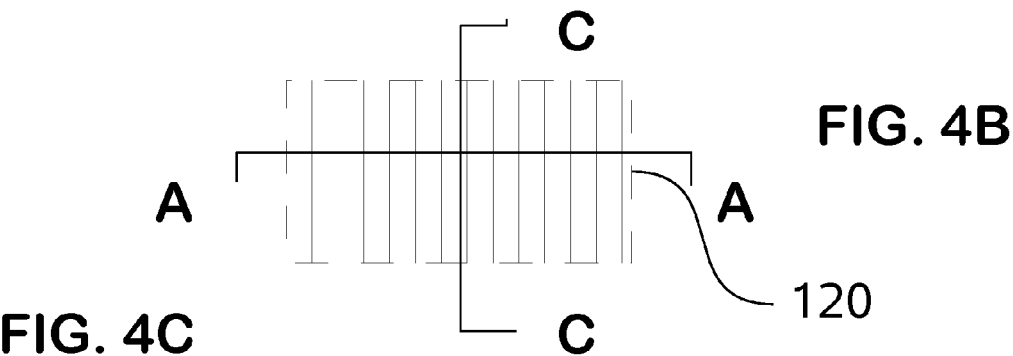
FIG. 4B
FIG. 4C
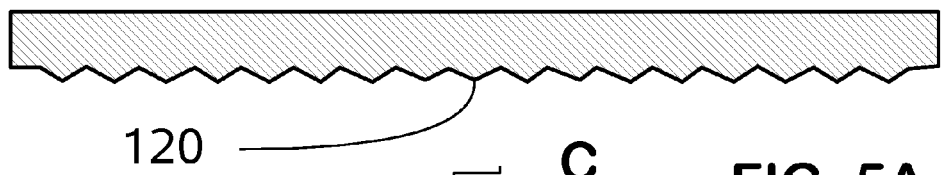
FIG. 5A
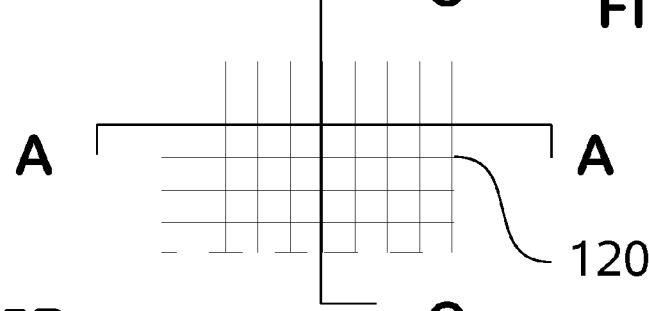
FIG. 5B
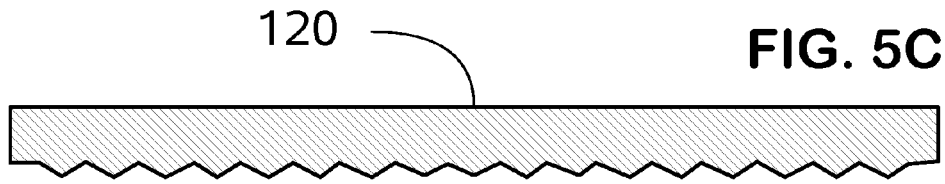
FIG. 5C

COOKWARE WITH MULTIPLE COMPONENT LID

CROSS REFERENCE TO RELATED APPLICATIONS

None

BACKGROUND OF INVENTION

The present invention relates to an article of cookware, and in particular to a cookware vessel with a multiple component lid.

The lid of a cookware vessel is conventionally a solid member with a diameter and edge size to fit into the upper rim of the underlying cooking vessel. A transparent lid is favored by some to observe the progress of cooking without removing the lid. Also known are lids with a plurality of hole to be used as a sieve or screen for draining water from pasta, for example.

A lid serves to retain the heat of cooking, as well as prevent the spatter of oil, boiling sauce and the like outside of the cooking vessel. While the progress of cooking can be observed through a transparent lid, the lid must be removed to stir the content of the cooking vessel. Removing the lid during stirring thus increases the likelihood of some of the contents spattering onto the cook or the kitchen area. Further, a transparent lid can easily become "fogged" by miniscule drops of vapor that condense on it, if it has not anti-fog coating (or if it is accidentally removed from aggressive cleaning). While glass lids can easily be cleaned of these condensed vapor drops, the contents of the pan must again be opened, inviting the possibility of spattered oil or sauce.

It is therefore a first object of the present invention to provide a cookware lid system and device that minimizes the potential for the contents of the cooking vessel to spatter when they are being stirred.

It is also an object of the invention to provide a glass cooking lid that is easy to clean.

SUMMARY OF INVENTION

In the present invention, the first object is achieved by providing a two component cookware lid for a cooking vessel. The cookware article comprises a substantially circular fluid containing cooking vessel having a substantially planar portion of the interior bottom cooking surface with substantially upright surrounding walls that terminate in a first rim. The lid for covering the cooking vessel has a first lower surrounding or annular component adapted for sealing engagement with the first rim of said fluid containing vessel and terminates at a second or upper rim. A cover is adapted for sealed engagement with the second rim of the lower annular component. The lower annular component has an inner concavity second or upper rim has a smaller circumference than the substantially planar portion of the interior bottom cooking surface. The cover or upper lid is preferably glass to observe the foodstuffs cooking in the vessel. When the cover or upper lid is removed to stir the contents the remaining lower annular components acts as a splash or spatter shield. More preferably, the cover or upper lid has a flat bottom surface so that it can be used as a food press when fitted against the interior bottom cooking surface.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a perspective view of the article of cookware with both the lower annular portion and the upper or cover portion of the lid attached.

FIG. 1B is a perspective view of the article of cookware with the upper or cover portion of the lid removed.

FIG. 1C is a perspective view of the article of cookware with the lower annular portion of the lid removed and the upper or cover portion of the lid disposed on the bottom cooking surface to serve as a food press.

FIG. 3A is a partial cutaway view of the elevation in FIG. 2.

FIG. 3B is a detail of the encircled portion of FIG. 3A.

FIG. 4A is a cross-sectional elevation of the cover portion in another embodiment of the invention, whereas FIG. 4B is a lower plan view of the a portion of the cover shown in FIG. 4A, showing the section line A-A and C-C, the latter corresponding to the cross-sectional elevation shown in FIG. 4C that is orthogonal to that of FIG. 4.

FIG. 5A is a cross-sectional elevation of the cover portion in another embodiment of the invention, whereas FIG. 5B is a lower plan view of the a portion of the cover shown in FIG. 5A, showing the section line A-A and C-C, the latter corresponding to the cross-sectional elevation shown in FIG. 5C that is orthogonal to that of FIG. 5A.

DETAILED DESCRIPTION

Figure 2:
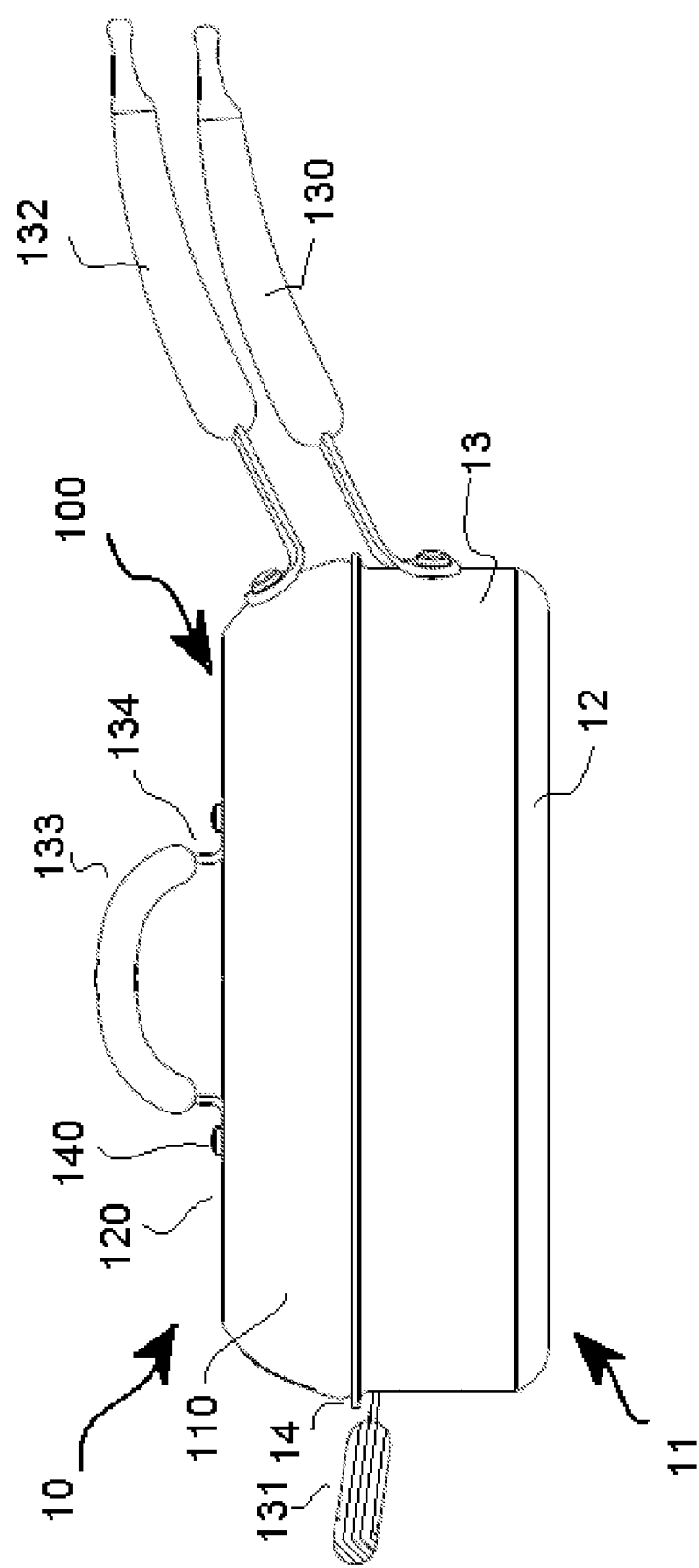
FIG. 2 is an external elevational of view of the article of cookware FIG. 1A.

Referring to FIGS. 1 through 3, wherein like reference numerals refer to like components in the various views, there is illustrated therein a new and improved multiple component lid for an article of cookware, generally denominated 100 herein.

In accordance with one embodiment of the present invention, the article of cookware 10 includes a food retaining cooking vessel 11 that comprises a substantially circular or elliptically shaped bottom cooking surface 12 surrounded by substantially upright walls 13, which extend upward to terminate in rim 14 to define a fluid containing vessel. The article of cookware 10 also includes a lid 100 that rests in substantially sealed engagement on rim 14. The lid 100 comprises a lower surrounding and preferably annular portion 110 that terminates in an upper rim 114 and an upper cover 120 that rests in substantially sealed engagement on or within the upper rim 114. In this embodiment the cover 120 is shown as being comprised of a horizontal member 125 that is a substantially flat transparent glass plate with a centrally disposed inverted U-shaped handle 133. The circumference of the upper rim 114 of the lower annular portion of the lid is at least somewhat smaller than the rim 14 of the cookware article 10 itself so that the walls 113 of the lid turn inward, preferably with concave curvature, as they extend upward from the rim 14 of the cooking vessel 11.

The configuration of the article of cookware 10 with lid 100 has the numerous benefits. First, only the uppermost covering portion 120 of the lid 100 need be removed for stirring the contents of the pot. Thus, with the remaining lower surrounding or annular portion 110 left in place on rim 14, the contents can be observed or stirred. In this arrangement, shown in FIG. 1B, the lower surrounding or annular portion 110 of lid 100 is available to intercept splashes or spatter or liquids or cooking oil out of the pan, thus acting as a spatter guard or shield for the cook.

In FIG. 3A, the cover 120 is shown in two alternative positions. First, as cover 120 resting on the rim 114 of the lower annular portion 110, also corresponding to the configuration shown in perspective in FIG. 1A. In the alternative mode of use, which is also shown in FIG. 1C, the lower annular portion 110 of lid 100 is removed and the cover 120' is deployed as a food press resting on the inner cooking surface of bottom 12.

Food presses are frequently used to cook bacon and similar thinly sliced meats having a relatively high fat content, which would otherwise curl and distort in shape when cooked on a griddle or frying pan. This is undesirable from an aesthetic, as well as practical viewpoint, as for example should the chefs wish to assemble sandwiches that stay closed. The pressure exerted by the mass of the cover 120 prevents curling of such meats that occurs due to uneven shrinkage, as fat is rendered during cooking or browning. Once the first side of the meat or bacon is sufficiently cooked, the now flat bacon pieces can turned over so that the opposite side may be cooked without the cover 120. However, the omission of the plate on cooking the second side depends on the thickness of the meat or foodstuff and the quantity of fat rendered there from. The lid 120 can also be used a food press to grill sandwiches and the like. Food presses also help render fat from thicker pieces of meat and cook irregular foodstuffs faster by increasing the contacting surface area with the heated interior bottom cooking surface.

Thus, the lower surface of horizontal member 125 opposite handle 133 is generally flat for use as a grill or food. Preferably, the horizontal member 125 of cover 120 is glass so that the progress of the cooking process and contents can be observed without the cover 120 being removed. The horizontal member 125 of cover 120 is more preferably tempered glass. It is further preferred, as shown in FIG. 3B, that the rim 114 of lower annular portion 110 has an interior descending portion 114b with a horizontal inward extending flange portion 114a at periphery thereof. As the inner horizontally extending flange 114a is intended to support the circumference of the horizontal member 125, it is preferable that the height of portion 114b is about the same as the thickness of the edge of the horizontal member 125. Further, it has become appreciated that in the case of the horizontal portion 125 of cover 120 being glass, the repeated contact between a hard or metal lower surrounding portion could wear, chip or abrade the glass. Thus, as shown in FIG. 3B, it is more preferable that the glass plate of horizontal member 125 has a circumferential protecting edge band 126, and most preferable that the edge band be metal. The edge band 126 thus covers the periphery of the glass portion of horizontal member 125. Thus, repeated metal to glass contact is avoided as the rim 114 is configured with portions 114a and 114b to engage and support the metal edge band 126, precluding direct contact with the glass in horizontal member 125.

It should be further appreciated that combination of a transparent glass horizontal member 125 to engage and rest with the lower annular portion 110 provides an alternative way of providing a generally a dome shaped lid while avoiding the need for specially formed or slumped glass to create the dome shape.

The article of cookware 10 has at least one side handle, such as long handle 130 on the cooking vessel portion 11. It is also further preferable that the cooking vessel itself has a short or helper side handle 131 directly opposite longer side handle 130. It is also preferable that both portions of the lid 100 have separate handles. Thus, the lower annular portion 110 has a handle 132 and cover 120 has a handle 133. Handle 133 is generally an inverted U-shape with an L-shaped flange 134 at each end. The horizontal portion of the "L" is used to attached to the horizontal member of cover 120 with a rivets 140.

It should be understood that in the preferred embodiments the lower annular portion 110 is metal or the same material used to construct the cooking vessel portion 11 of cookware article 10.

It should be understood that in other embodiments of the invention the cookware article is optionally a pot or a pan having an overall shape that is circular, elliptical, oblong, rectangular or square. The cover 120 while preferably being glass, can also be metallic, enamel covered metal or glass-ceramic material. Likewise, while the lower annular portion 110 is preferably metal it is also optionally glass, glass-ceramic, or enamel covered metal. Further, the cover portion 120 need not be entirely flat depending on the intended use as a food press, it may be slightly curved or textured (as shown in FIG. 5A-C) on one or more surface, as well as be corrugated with a series of ridges, (as shown in FIG. 4A-C) for example to produce grill marks on the food and/or intermesh with an interior bottom cooking surface having a complimentary ridge or grid pattern.

It should also be appreciated that the lid portion can be configured to have a lower central portion that acts as the food press, with a surrounding region being available for engaging and resting on rim 114.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A cookware article comprising,
   a) a fluid containing vessel having a substantially planar portion of the interior bottom cooking surface and substantially upright surrounding walls extending there from to terminate in a first rim,
   b) a lower surrounding cover portion having a lower surface adapted for sealing engagement with the first rim of said fluid containing vessel and terminating at a second rim,
   c) an upper cover adapted for sealed engagement with the second rim of said lower surrounding cover portion wherein said lower surrounding cover portion slopes inward and upward to the second rim such that the upper cover has a smaller circumference than the substantially planar portion of the interior bottom cooking surface, wherein the upper cover is a plate having two substantially planar and parallel surfaces that extend over the width thereof between the second rim of the said lower surrounding cover portion of the lid surfaces, without any portion extending substantially above the second rim,
   d) one or more handles disposed on each of said fluid containing vessel and said upper cover for grasping and separating said upper cover from said lower surrounding cover portion.

2. A cookware vessel according to claim 1 wherein said upper cover and said lower surrounding cover are not capable of retaining water.

3. A cookware vessel according to claim 1 wherein said upper cover has a lower surface opposite the handle that is corrugated.

4. A cookware vessel according to claim 1 wherein said upper cover has a lower surface opposite the handle that is textured.

5. A cookware vessel according to claim 1 wherein said upper cover comprises glass.

6. A cookware vessel according to claim 5 wherein the edge of the said glass cover is protected by a circumferential band.

7. A cookware vessel according to claim 6 wherein the circumferential band is metal.

8. A cookware vessel according to claim 7 wherein the second rim of said lower surrounding cover portion has an interior descending portion from which extends horizontally inward a flange portion for receiving the circumferential meta band that covers the exposed edge of the glass upper cover whereby the glass is precluded from contacting the lower surrounding cover portion.

9. A cookware vessel according to claim 8 wherein the circumferential metal band of the upper cover portion nests within the interior descending portion of the second rim such that the top of the upper cover is substantially flush with the upper edge of the second rim.

10. A lid for a cooking vessel, the lid comprising:
   a) a lower surrounding cover portion having a lower surface of a first circumference adapted for sealed engagement with the rim of a fluid containing vessel and terminating at a second rim,
   b) an upper cover adapted for sealed engagement with the second rim of said lower surrounding cover portion wherein said lower surrounding cover portion tilts inward and upward such that said upper cover has a smaller circumference than the first circumference,
   c) one or more handle disposed on at least one of said lower surrounding portion and said upper cover portion of the lid cover for grasping and separating said upper cover from said lower surrounding cover portion wherein the upper cover is a plate having two substantially planar and parallel surfaces that extend over the width thereof between the second rim of the said lower surrounding cover portion, without any portion of the lid surfaces extending substantially above the second rim, and said lower surrounding cover are not capable of retaining water.

11. A lid for a cooking vessel according to claim 10 wherein said upper cover has a substantially lower surface opposite the handle has at least a lower portion that is substantially flat.

12. A lid for a cooking vessel according to claim 10 wherein said upper cover has a substantially lower surface opposite the handle that is corrugated.

13. A lid for a cooking vessel according to claim 10 wherein said upper cover has a substantially lower surface opposite the handle that is textured.

14. A lid for a cooking vessel according to claim 11 wherein said upper cover comprises a glass portion that extends substantially to the periphery thereof.

15. A cookware vessel according to claim 14 wherein the glass periphery of the said upper cover is protected by a circumferential band.

16. A cookware vessel according to claim 15 wherein the circumferential band is metal.

17. A cookware vessel according to claim 16 wherein the second rim of said lower surrounding cover portion has an interior descending portion from which extends horizontally inward a flange portion for receiving the circumferential metal band of said upper cover whereby the glass portion thereof is precluded from contacting the lower surrounding cover portion.

18. A cookware vessel according to claim 17 wherein the circumferential metal band of said upper cover nests within the interior descending portion of the second rim such that the top of the upper cover is substantially flush with the upper edge of the second rim.

19. A lid for a cooking vessel, the lid comprising:
   a) a lower surrounding cover portion having a lower surface of a first circumference adapted for sealed engagement with the rim of a fluid containing vessel and terminating at a second rim, the second rim having an interior descending portion from which extends horizontally inward a flange portion,
   b) a glass upper cover adapted for nested and sealed engagement within the descending and flanges portion of the second rim of said lower surrounding cover portion, wherein said lower surrounding cover portion tilts inward such that said glass upper cover has a smaller circumference than the first circumference, wherein said glass upper cover further comprises;
     i) a metal band that extends circumferentially to at least protect the edge of the glass,
     ii) an upward extending handle.

20. A lid for a cooking vessel according to claim 16 wherein at least the central most portion forming the lower surface of the glass upper cover is a substantially flat tempered glass plate to act as a food press as well as a lid cover portion.

21. A cookware article comprising,
   a) a fluid containing vessel having a substantially planar portion of the interior bottom cooking surface and substantially upright surrounding walls extending there from to terminate in a first rim,
   b) a lower surrounding cover portion having a lower surface adapted for sealing engagement with the first rim of said fluid containing vessel and terminating at a second rim,
   c) an upper cover adapted for sealed engagement with the second rim of said lower surrounding cover portion wherein said lower surrounding cover portion slopes inward and upward to the second rim such that the upper cover has a smaller circumference than the substantially planar portion of the interior bottom cooking surface,
   d) one or more handles disposed on each of said fluid containing vessel and said upper cover for grasping and separating said upper cover from said lower surrounding cover portion, wherein the upper cover and the lower surrounding cover are at least one of convex and planar in shape so as to preclude having a concave portion capable of retaining water, and wherein said upper cover has an upper surface that is substantially flat and a lower surface opposite the handle that is substantially flat.

22. A cookware vessel according to claim 21 wherein said upper cover has a lower surface opposite the handle that is corrugated.

23. A cookware vessel according to claim 21 wherein said upper cover has a lower surface opposite the handle that is textured.

24. A cookware vessel according to claim 21 wherein said upper cover comprises glass.

* * * * *